Jan. 23, 1934.  W. F. WAMHOFF  1,944,381

SEED DISPENSING DEVICE

Filed Jan. 19, 1931

Inventor
William F. Wamhoff
By H. P. Doolittle,
Atty.

Patented Jan. 23, 1934

1,944,381

UNITED STATES PATENT OFFICE 1,944,381

SEED DISPENSING DEVICE

William F. Wamhoff, Emblem, Wyo., assignor to International Harvester Company, a corporation of New Jersey Application January 19, 1931. Serial No. 509,696

3 Claims. (Cl. 221—138)

This invention relates to a seed planter.

More particularly, it relates to a hopper construction to provide for the uniform dispensing of beet seed.

In the construction of planter hoppers, particularly for certain type of seeds, considerable difficulty has been encountered in preventing the packing of seeds over the seed plates and in assuring the uniform delivery of seed to the seed cells and to the distributing mechanism.

The object of this invention is to provide a hopper construction, to be utilized in connection with a conventional seed distributing mechanism, for assuring the uniform supply of seed in such a manner that the seed cells will at all times be supplied with seed.

Another object is to provide a hopper construction which is particularly adaptable for use in connection with a planter such as shown in Patent No. 1,899,931 to Benjamin et al., issued March 7, 1933, in which a main seed supply hopper is carried at a distance above the seed dispensing hopper.

These and other objects are accomplished by the construction shown in the drawing, in which—

Figure 1:
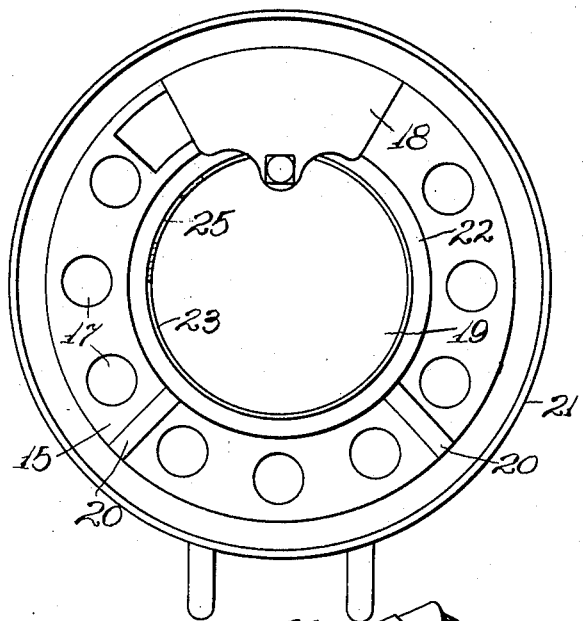
Figure 1 is a plan view of a seed hopper with the top removed, embodying the invention.
Figure 2:
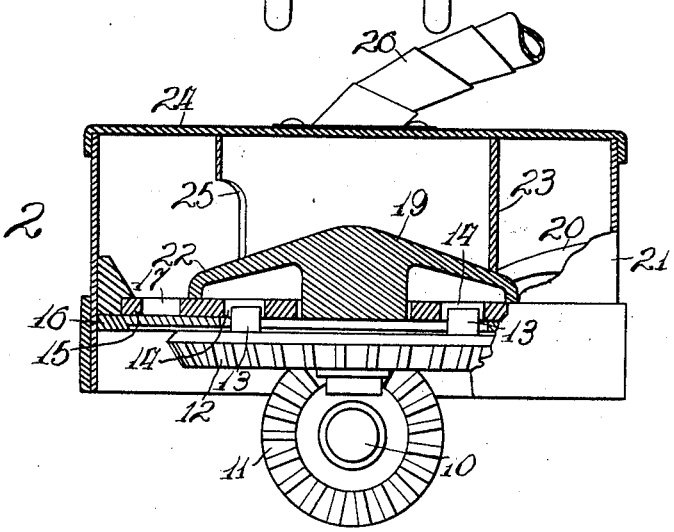
Figure 2 is a sectional view taken through the center of the hopper shown in Figure 1, with the cover in position.
Figure 3:
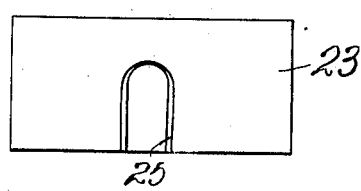
Figure 3 is a side elevation of the inside partition and an essential element of the invention.

The device of this invention may be utilized in almost any seed dispensing hopper employing any conventional type of seed distributing means.

Only such parts of the seed distributing means are shown as are necessary to illustrate the nature of this invention. The Ford Patent No. 1,323,625, December 2, 1919, shows a seed planter utilizing a dispensing hopper, a seed plate and driving mechanism therefor of the same general construction as that illustrated in the drawing.

A shaft 10, which is driven by any means ordinarily used in planters, carries a bevel gear 11 which engages a horizontally positioned bevel gear 12. Said shaft and said gears are properly mounted and supported by any conventional means. The gear 12 carries a plurality of upstanding lugs 13, positioned to engage slots 14, formed in an annular seed plate 15. The seed plate 15 is rotatably mounted above a stationary plate 16, which forms the bottom of the hopper. The seed cells 17 are formed around the plate 15.

A seed discharging mechanism 18 is provided in the hopper. Said seed discharging mechanism is not shown in detail as it is not a part of this invention.

A centrally located member 19 is mounted in the hopper above the seed plate 15 and is supported in position by webs 20 extending from the member to the vertical wall of the hopper. The member 19 is conical in shape, tapering downwardly, outwardly from the center. A flange 22 turns downwardly around the outer edge of said member and terminates adjacent the seed plate 15. A cylindrical partition member 23 is mounted in the hopper. Said member fits against the conical surface of the member 19. The top of the partition member terminates at the level of the side wall 21 of the hopper, whereby the cover 24 of the hopper fits against the top edge of said member.

An opening 25 formed in the partition member 23 provides communication between the interior of the compartment formed by the member 23, and the annular space or compartment formed between the partition member and the vertical wall of the hopper. A flexible seed supply tube 26 communicates with the central part of the cover 24.

In the operation of a planter embodying the invention, seed is supplied to the hopper through the tube 26. In a construction, previously referred to, the seed in said tube is under pressure due to the height of the main supply hopper. It is evident, therefore, that the seed in the interior part of the dispensing hopper will completely fill said portion of the hopper and may be somewhat packed due to the pressure. Through the opening 25 seed is continually discharged into the annular space, the bottom of which is traversed by the seed plate. The seed is engaged in the seed cells and is delivered to the discharging mechanism. By the provision of the partition member 23 the seed above the seed cells is loosely distributed and is under a substantially uniform low pressure which prevents the collection of seeds of irregular shape and of varying weight and packing of the seeds over the seed cells. It has been found that when utilizing certain types of seed, such for example as beet seed, that the difficulties encountered in obtaining uniform distribution of the seed have been overcome by the provision of a device as described.

Although the invention is of particular value when using a small hopper and a seed supply tube, as described, it is to be understood that it also produces improved results when used with a conventional seed hopper.

Applicant has shown only a preferred embodiment of his improved planter construction and contemplates as his invention all modifications falling within the scope of the appended claims.

What is claimed is:

1. In a planter and in combination therewith a seed hopper having a bottom in which a substantially annular opening is formed around the periphery thereof, a seed plate rotatably mounted over said opening, a partition in the hopper positioned to form a central seed supply compartment and a surrounding seed delivery compartment in communication with the seed plate, said partition being provided with an opening to provide a means of communication between the two compartments, and a cover for simultaneously closing both of the compartments.

2. In a planter and in combination therewith a seed hopper having a bottom in which a substantially annular opening is formed around the periphery thereof, a seed plate rotatably mounted over said opening, a partition in the hopper positioned to form a central seed supply compartment and a surrounding seed delivery compartment in communication with the seed plate, said partition being provided with an opening to provide a means of communication between the two compartments, a cover for simultaneously closing both of the compartments, and a seed supply tube connected with the cover and communicating with the central seed supply compartment.

3. In a planter a seed hopper having a cylindrical vertical wall, a bottom member of less diameter than the cylindrical wall positioned at the bottom thereof and secured thereto, said member being centrally located and with the cylindrical wall defining a substantially annular opening, a seed plate rotatably mounted below the hopper over said annular opening, means for driving said plate, a cylindrical partition positioned in the hopper and resting on the bottom member forming thereby an inner cylindrical chamber and an outer annular chamber communicating with the seed plate, an opening in the partition adjacent the bottom thereof forming communication between the two chambers, a cover closing the hopper and the inner chamber formed by the partition member, and a flexible seed delivery conduit connected to the cover over the inner chamber for supplying seed thereto.

WILLIAM F. WAMHOFF.